US012188463B2

(12) United States Patent
Kim (10) Patent No.: US 12,188,463 B2
(45) Date of Patent: Jan. 7, 2025

(54) AIR COMPRESSOR FOR VEHICLE AND METHOD FOR CONTROLLING TEMPERATURE OF THE SAME (71) Applicants: HYUNDAI MOTOR COMPANY, Seoul (KR); KIA CORPORATION, Seoul (KR)

(72) Inventor: Dong Wook Kim, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 254 days.

(21) Appl. No.: 17/736,730

(22) Filed: May 4, 2022

(65) Prior Publication Data
US 2023/0150335 A1  May 18, 2023

(30) Foreign Application Priority Data
Nov. 17, 2021  (KR) .................. 10-2021-0158104

(51) Int. Cl.
*F04B 39/06* (2006.01)
*B60K 11/00* (2006.01)
*B60K 11/04* (2006.01)
*F04B 49/10* (2006.01)

(52) U.S. Cl.
CPC .............. *F04B 39/06* (2013.01); *B60K 11/00* (2013.01); *B60K 11/04* (2013.01); *F04B 39/066* (2013.01); *F04B 49/10* (2013.01); *F04B 2203/0205* (2013.01)

(58) Field of Classification Search
CPC ........ F04B 39/06; F04B 39/066; F04B 49/10; F04B 2203/0205; B60K 11/00; B60K 11/04
See application file for complete search history.

(56) References Cited

U.S. PATENT DOCUMENTS

| 8,128,379 B2 | 3/2012 | Hritz | |
| 2005/0008503 A1* | 1/2005 | Dudley | F04B 39/0207 417/313 |
| 2014/0044569 A1* | 2/2014 | Kremer | F04B 39/06 417/243 |
| 2015/0075205 A1* | 3/2015 | Ramayya | F25B 13/00 62/324.6 |
| 2021/0155224 A1* | 5/2021 | McKibben | B60L 50/75 |

(Continued)

FOREIGN PATENT DOCUMENTS

| CN | 207048926 U | 2/2018 |
| CN | 211116464 U | 7/2020 |
| JP | H11-278044 A | 10/1999 |

(Continued)

Primary Examiner — Charles G Freay
(74) Attorney, Agent, or Firm — MORGAN, LEWIS & BOCKIUS LLP (57) ABSTRACT An air compressor apparatus for a vehicle configured for appropriately maintaining an internal temperature and a discharge temperature thereof even in a cold environment, and a method for controlling a temperature of the same, includes a compressor body driven by a first motor; a support bracket supporting the compressor body and configured to be coupled to the vehicle; and a heat exchanger provided on one side of the support bracket, and configured for raising a temperature of external air to generate heated air and provide the heated air to the compressor body.

18 Claims, 7 Drawing Sheets (56) References Cited

U.S. PATENT DOCUMENTS

2023/0235734 A1* 7/2023 Kramlich .............. F04B 39/066
                                                                417/228

FOREIGN PATENT DOCUMENTS

| JP | 2003-118396 A | 4/2003 |
| JP | 2017-516013 A | 6/2017 |
| KR | 20-0171614 Y1 | 3/2000 |
| KR | 10-2019-0035104 A | 4/2019 |
| WO | 2015/171868 A1 | 11/2015 |

* cited by examiner

AIR COMPRESSOR FOR VEHICLE AND METHOD FOR CONTROLLING TEMPERATURE OF THE SAME

CROSS-REFERENCE TO RELATED APPLICATION(S)

The present application claims priority to Korean Patent Application No. 10-2021-0158104 filed on Nov. 17, 2021 the entire contents of which is incorporated herein for all purposes by this reference.

BACKGROUND OF THE PRESENT DISCLOSURE

Field of the Present Disclosure

The present disclosure relates to an air compressor for a vehicle, such as a large electric vehicle, capable of appropriately maintaining an internal temperature and a discharge temperature thereof even in a cold environment, and a method for controlling a temperature of the same.

Description of Related Art

For example, a large electric vehicle such as a bus or truck provided with a fuel cell system is driven by operating a driving motor with electricity produced by a fuel cell stack. That is, the large electric vehicle is driven only by driving force of the driving motor with no engine. Accordingly, as an air compressor mounted on the large electric vehicle, an electric air compressor is employed.

Such an electric air compressor compresses and discharges air, for example, through rotation motion of a motor and a crankshaft therein, which accompany reciprocating motions (for compression and expansion) of a plurality of pistons connected to the crankshaft and provided in a plurality of cylinders. When air is consumed by a pneumatic system such as a braking device or a suspension device, if a pressure in an air tank of the vehicle decreases to such an extent that the air tank needs to be charged, the electric air compressor may be operated to compress and discharge air and supply the air to the air tank.

When the present process is repeated, temperatures of the motor and the cylinders of the air compressor continuously rise. When the temperatures of the motor and cylinders exceed appropriate temperatures thereof, a lubrication function deteriorates in the cylinders and oil carbide is discharged, causing problems such as a decrease in performance of the pneumatic system, a reduction in efficiency, and deteriorations of portions.

To prevent these problems, it is necessary to cool the cylinders of the electric air compressor. As an exemplary embodiment of the present disclosure, an air cooler, in which a cooling fan is provided in each cylinder head to cool the cylinder, may be employed. Thus, when power is supplied to the vehicle, power is applied to a motor of the cooling fan to operate the cooling fan, cooling each of the cylinders. In other words, the cooling fan may be driven to cool the cylinder regardless of whether the air compressor is in operation.

The air cooler is advantageous in that a complicated configuration of a cooling circuit may be omitted. However, the air cooler may rapidly reduce a temperature of air discharged from the air compressor due to cold weather or according to the performance of the cooling fan. As a result, moisture may be generated in a pipeline continuing from a discharge pipe of the air compressor to the pneumatic system, or moisture and oil generated in the cylinder are mixed and an emulsion including a high viscosity is generated and frozen.

Such frozen emulsion may affect the pneumatic system, the braking device using pneumatic pressure, braking performance may deteriorate or be lost, leading to a vehicle safety problem in which braking is impossible.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an air compressor apparatus for a vehicle configured for appropriately maintaining an internal temperature and a discharge temperature thereof even in a cold environment, and a method for controlling a temperature of the same.

According to an aspect of the present disclosure, an air compressor apparatus for a vehicle may include: a compressor body driven by a first motor; a support bracket supporting the compressor body and configured to be coupled to the vehicle; and a heat exchanger provided on one side of the support bracket, and configured for raising a temperature of external air to generate heated air and provide the heated air to the compressor body.

The compressor body may include a cylinder and a cooling fan provided on the cylinder to cool the cylinder, and the cooling fan may include a second motor.

Cooled air from the cooling fan may be transferred to an external peripheral surface of the cylinder and an external surface of the compressor body.

The heat exchanger may have a flow path formed for a coolant to flow therethrough, the heat exchanger may include at least one blowing fan supplied with power to rotate, and the at least one blowing fan may include a third motor.

The heat exchanger may also serve as an electric radiator cooling a power electric (PE) module of the vehicle.

The heated air from the heat exchanger may be supplied onto an external surface of the compressor body by the at least one blowing fan.

The compressor body may further include a temperature detector measuring a temperature of the first motor.

The air compressor apparatus may further include a control unit controlling the at least one blowing fan of the heat exchanger and the cooling fan of the compressor body to be selectively operated according to a detection signal received from the temperature detector.

The control unit may be electrically connected to the temperature detector via an inverter controller, and the control unit and the inverter controller may be connected to each other through a communications link.

The heat exchanger may be provided to face the outside of the vehicle on the support bracket.

According to another aspect of the present disclosure, a method for controlling a temperature of the above-described air compressor apparatus may include: monitoring a temperature of the first motor in the compressor body, when the compressor body is in operation; providing the heated air generated by the heat exchanger to the compressor body, when the temperature of the first motor is lower than a first temperature; and cooling the compressor body, when the temperature of the first motor is higher than a second temperature, wherein the second temperature is higher than the first temperature.

The method may further include determining whether or not the compressor body is in operation.

The providing of the heated air to the compressor body may be performed by operating the third motor to drive the at least one blowing fan.

The cooling of the compressor body may be performed by operating the second motor to drive the cooling fan.

The method may further include, after the cooling of the compressor body, stopping the operation of the at least one blowing fan and the cooling fan when the temperature of the first motor becomes higher than or equal to the first temperature and lower than a third temperature, wherein the third temperature may be higher than the first temperature and lower than the second temperature.

The method may further include, after the monitoring of the temperature of the first motor: comparing the temperature of the first motor with a third temperature when the temperature of the first motor is higher than or equal to the first temperature and lower than or equal to the second temperature; cooling the compressor body when the temperature of the first motor is higher than or equal to the third temperature; and stopping the operation of the at least one blowing fan and the cooling fan when the temperature of the first motor is lower than the third temperature, wherein the third temperature is higher than the first temperature and lower than the second temperature.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described with reference to the accompanying drawings. Regarding the reference numerals assigned to the components in the drawings, it should be noted that the same components will be denoted by the same reference numerals although they are shown in different drawings.

In the present specification, a vehicle refers to any type of vehicle that moves a subject such as a person, an animal, or a thing from a departure point to a destination point. Such a vehicle is not limited to a vehicle traveling on roads or tracks.

In the present specification, the present disclosure is described by taking a large electric vehicle as an example for convenience of explanation, but the present disclosure is not necessarily limited thereto.

In addition, the terms "first", "second", and the like may be used to describe various components, but these components are not limited in order, size, location, or importance by the terms "first". "second", and the like, and are used only for distinguishing one component from another component.

Figure 1:
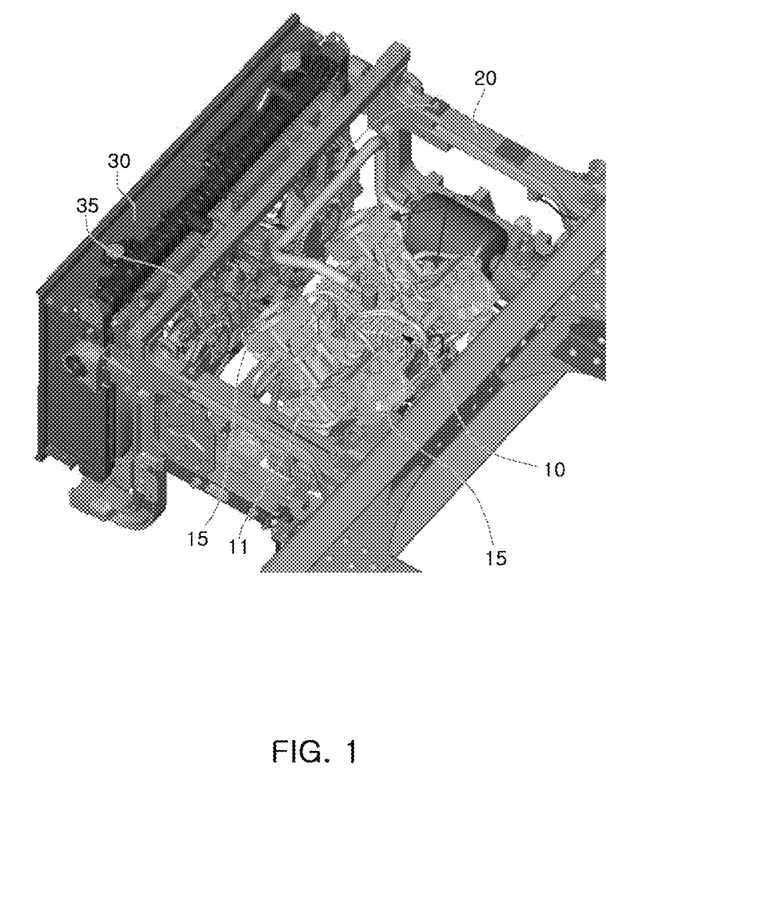
FIG. 1 is a view exemplarily illustrating an air compressor for a vehicle according to an exemplary embodiment of the present disclosure.
Figure 2:
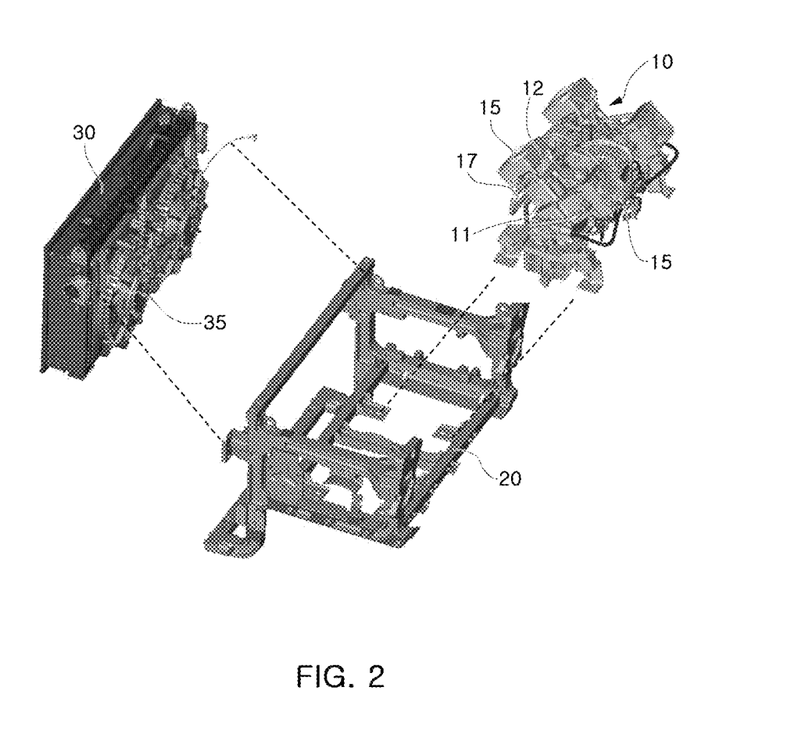
FIG. 2 is an exploded perspective view of FIG. 1.

FIG. 1 is a view exemplarily illustrating an air compressor for a vehicle according to an exemplary embodiment of the present disclosure, and FIG. 2 is an exploded perspective view of FIG. 1.

As illustrated in FIG. 1 and FIG. 2, the air compressor for a vehicle according to an exemplary embodiment of the present disclosure may include a compressor body 10, a support bracket 20, and a heat exchanger 30.

The compressor body 10 is an electric air compressor including a first motor 13 (see FIG. 6) operating based on an electric signal. A crankshaft provided in the compressor body may be connected to the first motor to drive at least one piston in at least one cylinder 11. Here, the first motor may be built into the compressor body.

In the compressor body 10, when the first motor 13 is driven, the crankshaft connected to the first motor may be forcibly rotated so that the piston provided in each cylinder 11 reciprocates (for compression and expansion).

During a compression stroke of the piston, external air may be provided into the cylinder 11 to become compressed air. Accordingly, during an expansion stroke of the piston, the compressed air may be discharged out of the cylinder through a discharge pipe 17 of a cylinder head 12.

The compressor body 10 may further include a plurality of cooling fans 15 provided on the cylinder heads 12 of the respective cylinders 11 to cool the cylinder heads and the cylinders. Each of the cooling fans may include a second motor 16 (see FIG. 6) which is integrally formed therewith.

Cold air from the cooling fan 15 may prevent the cylinder from being overheated by cooling the cylinder head 12 and the cylinder 11 while passing through external peripheral surfaces thereof. Furthermore, cold air discharged from the plurality of cooling fans may be evenly transferred to an external surface of the compressor body 10 so that the compressor body and components inside the compressor body are uniformly cooled, maximizing efficiency in cooling the compressor body.

Furthermore, the compressor body 10 may further include a temperature detector 14 (see FIG. 6) measuring an internal temperature thereof, more specifically a temperature of the first motor 13.

The temperature detector 14 may be provided on the first motor 13 in the compressor body 10 to detect a temperature of the first motor and output a detection signal to an inverter controller 42 (see FIG. 6), which will be described later.

In the air compressor for a vehicle according to an exemplary embodiment of the present disclosure, because the rotation motion of the first motor 13 built in the compressor body 10 enables the reciprocating motion of the piston in the cylinder 11 so that air is compressed, an internal temperature of the cylinder and a discharge temperature of the compressor body may be controlled simultaneously by measuring and controlling a temperature of the first motor.

The support bracket 20 may be formed in a frame structure including an approximately hexahedral shape. For example, the support bracket may be formed by coupling a plurality of horizontal members, vertical members, and pillar members which are formed separately, but is not necessarily limited thereto, and may be integrally formed.

The support bracket 20 may be provided and mounted on a vehicle body 1, for example, so that a front surface of the heat exchanger 30 faces the side of the vehicle. However, the position at which the support bracket is mounted and the arrangement relationship of the support bracket in the air compressor are not necessarily limited thereto, and the position at which the support bracket is mounted may be changed to another position of the vehicle body.

The compressor body 10 may be accommodated inside the support bracket 20, and the heat exchanger 30 may be mounted on one external surface of the support bracket. In the instant case, the heat exchanger is provided to face the outside of the vehicle on the support bracket coupled to the vehicle body 1, while the compressor body is provided adjacent to the interior of the vehicle.

The support bracket 20 may be coupled to the vehicle body 1 by bolting, and similarly, the compressor body 10 and the heat exchanger 30 may be coupled to the support bracket by bolting. The bolting-based coupling enables stable assembling and easy separation, improving the assemblability and productivity of the vehicle and reducing a time and an effort required for maintenance or replacement.

Furthermore, by modularizing the compressor body 10 and the heat exchanger 30 using the support bracket 20, the compressor body 10 and the heat exchanger 30 may be easily mounted on a vehicle as a single module during an assembling process. Accordingly, it is possible to reduce the number of assembly processes and material costs in a vehicle manufacturing line, and implement an efficient layout of the vehicle.

The heat exchanger 30, which is provided to cool a coolant flowing along a predetermined coolant circuit, has a flow path formed therein for the coolant to pass therethrough. The coolant may be water or an incompressible fluid.

The heat exchanger may be, for example, a radiator. Furthermore, the heat exchanger 30 may include at least one blowing fan 35 electrically connected to a battery 44 and supplied with power from the battery to rotate. The at least one blowing fan may include a third motor 36 (see FIG. 6) which is integrally formed therewith.

The at least one blowing fan 35 may be configured and provided to be rotated by the third motor 36 supplied with power from the battery 44 so that a constant amount of external air is supplied to the heat exchanger 30, and then hot air generated by the heat exchanger from the external air is transferred to the compressor body 10.

When the vehicle is, for example, a large electric vehicle provided with a fuel cell system, such as a bus or a truck, the heat exchanger 30 may also serve as an electric radiator in which the coolant for cooling a power electric module passes. In other words, the electric radiator, which may be located in the front of the vehicle, may be provided in the middle portion of the side of the vehicle and integrated with the compressor body 10 of the present disclosure.

To the present end, the heat exchanger 30 may be connected to the power electric module including a driving motor, an inverter 43, a decelerator, etc. In the vehicle provided with the fuel cell system, and the coolant heated in the power electric module may be cooled while passing through the inside of the heat exchanger.

The heat exchanger 30 and the power electric module may be connected to each other by a cooling hose, and the cooled coolant may be pumped through a pump and transferred to the power electric module. The pump may be an electric water pump driven by a motor supplied with power from the battery 44 to circulate the coolant.

When the heat exchanger 30 is further configured as an electric radiator as described above, an operation of the pump may be controlled depending on a temperature of the coolant. A rise in temperature of the power electric module, which is operated at all times after the vehicle is started, may cause a rise in temperature of the coolant after a certain time period elapses from the start of the vehicle. Accordingly, the pump may be operated, and the heat exchange function of the heat exchanger may be continuously performed using the circulating coolant after the start of the vehicle.

However, the application example of the heat exchanger 30 is not necessarily limited thereto, and the heat exchanger 30 may be applied as a radiator of a coolant circuit for cooling another component in the vehicle. In the instant case, the radiator may be operated by separately controlling a pump of the coolant circuit if necessary.

Meanwhile, the external air flowing toward the heat exchanger 30 and passing in contact with the heat exchanger may exchange heat with the coolant passing through the inside of the heat exchanger to cool the coolant, and at the same time, a temperature of the external air may be raised. The heated air, that is, hot air, may be transferred to the external surface of the compressor body 10, which is provided adjacent to the heat exchanger and modularized with the heat exchanger, by a blowing fan 35.

The air compressor for a vehicle according to an exemplary embodiment of the present disclosure may further include a control unit 40 (see FIG. 6) controlling the at least one blowing fan 35 of the heat exchanger 30 and the cooling fan 15 of the compressor body 10 to be selectively operated according to a detection signal received from the temperature detector 14.

The control unit 40 may be implemented using various kinds of processing devices such as a microprocessor in which a semiconductor chip or the like configured for performing various determinations or commands is embedded, and may control an overall operation of the air compressor for a vehicle according to an exemplary embodiment of the present disclosure.

For example, the control unit 40 may be incorporated into or used in combination with a vehicle control unit (VCU).

The control unit 40 may be electrically connected to the temperature detector 14 of the compressor body 10 to receive a detection signal. The control unit may be electrically connected to the temperature detector via the inverter controller 42. The control unit and the inverter controller may be connected to each other through a communications link 41 (see FIG. 6).

As the communications link 41, for example, wireless communication such as a local area network using a controller area network (CAN) protocol may be employed, but the communications link 41 is not necessarily limited thereto, and wired communication or optical communication may be applied as the communications link 41.

Furthermore, the control unit 40 may control the operation of the at least one blowing fan 35 of the heat exchanger 30 and the cooling fan 15 of the compressor body 10, that is, the operation of the third motor 36 and the second motor 16, according to a signal detected by the temperature detector 14.

For example, when the temperature of the first motor 13 in the compressor body 10 is lower than a first temperature, the third motor 36 is operated to drive the at least one blowing fan 35 so that air heated by the heat exchanger 30 is provided to the compressor body.

When the temperature of the first motor 13 in the compressor body 10 is higher than a second temperature, the second motor 16 is operated to drive the cooling fan 15 to cool the compressor body. At the instant time, the operation of the third motor 36 and blowing fan 35 is stopped.

Thereafter, when the temperature of the first motor 13 in the compressor body 10 is higher than or equal to the first temperature and lower than a third temperature, the operation of the cooling fan 15 as well as the at least one blowing fan 35 is stopped.

Here, the aforementioned temperatures may have a relationship of the first temperature<the third temperature<the second temperature. For example, the first temperature may be 60° C., the third temperature may be 70° C., and the second temperature may be 80° C.

Figure 3:
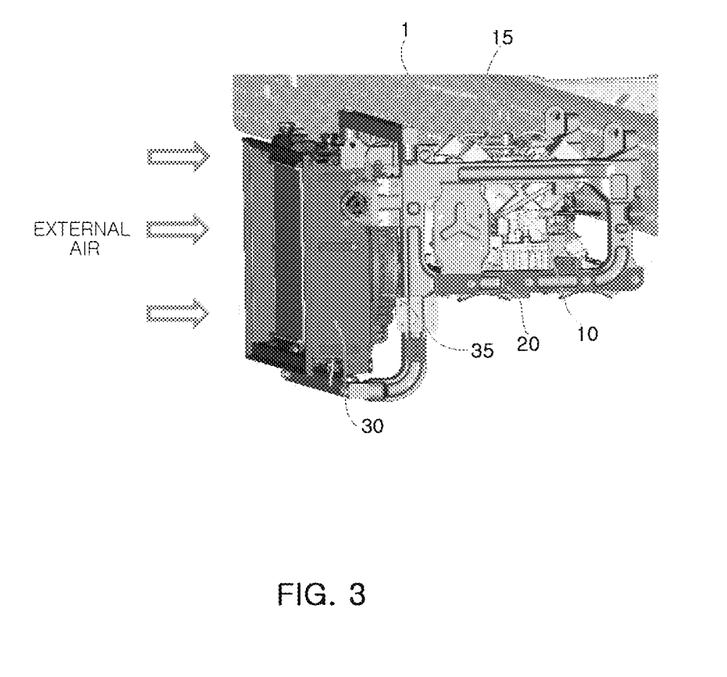
FIG. 3 is a view exemplarily illustrating the air compressor for a vehicle according to an exemplary embodiment of the present disclosure in a mounted state on the vehicle.
Figure 4:
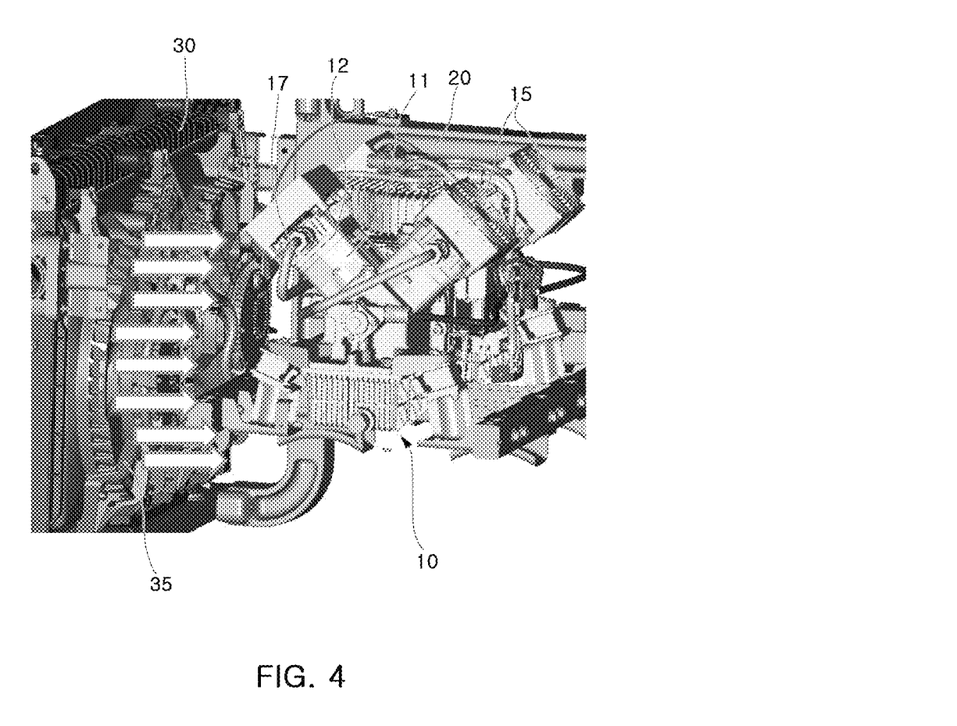
FIG. 4 is a view exemplarily illustrating a blowing fan in an operating state in the air compressor for a vehicle according to an exemplary embodiment of the present disclosure.

FIG. 3 is a view exemplarily illustrating the air compressor for a vehicle according to an exemplary embodiment of the present disclosure in a mounted state on the vehicle, and FIG. 4 is a view exemplarily illustrating the at least one blowing fan in an operating state in the air compressor for a vehicle according to an exemplary embodiment of the present disclosure.

In FIG. 3 and FIG. 4, it is shown that external air is heated and becomes hot air while passing through the heat exchanger 30, and then the hot air flows toward the external peripheral surface of the compressor body 10, particularly the cylinder 11. In FIG. 4, the hot air is indicated by arrows.

In the air compressor for a vehicle according to an exemplary embodiment of the present disclosure, the operation of the cooling fan 15 of the compressor body 10 may be basically controlled so that cold air generated through the cooling fan cools the cylinder head 12 and the cylinder 11 while passing through the external peripheral surfaces thereof, preventing the cylinder from being overheated.

Furthermore, in the air compressor for a vehicle according to an exemplary embodiment of the present disclosure, the operation of the at least one blowing fan 35 together with the heat exchanger 30 may be controlled to provide hot air toward the compressor body 10, increasing an amount of heat dissipation toward the compressor body, while the operation of the cooling fan 15 mounted on the cylinder head 12 of the compressor body is controlled to reduce an amount of cooling, appropriately maintaining an internal temperature of the compressor body.

As a result, the air compressor for a vehicle according to an exemplary embodiment of the present disclosure is capable of basically preventing deteriorations of portions due to oil carbide in a high-temperature environment, and also, raising an internal temperature and a discharge temperature of the compressor body 10 to prevent an excessive drop in an internal temperature of the compressor body 10 in a cold environment, suppressing generation of moisture.

Considering that moisture mixed with oil in the cylinder 11 generates emulsion, which is high-viscosity liquid, or is frozen in a pipeline and a pneumatic system, the internal temperature and the discharge temperature of the compressor body 10 may be appropriately raised to prevent generation of moisture and emulsion derived therefrom, protecting the pneumatic system associated with the air compressor and keeping the pneumatic system to have excellent performance.

Furthermore, in the air compressor for a vehicle according to an exemplary embodiment of the present disclosure, the heat exchanger 30 may be provided to face the outside of the vehicle on the support bracket 20 so that the heat exchanger acts as a barrier to prevent wet or cold external air from flowing directly into the compressor body 10.

Thus, external air needs to pass through at least the heat exchanger 30 to reach the compressor body 10 in the support bracket 20. This is advantageous in protecting the compressor body and preventing the inflow of moisture in a high-humidity environment such as during a rainy season.

Furthermore, in a cold environment, the heat exchanger 30 mounted on an external side of the support bracket 20 may act to block cold external air flowing toward the inside of the module. This may be helpful to some extent in preventing continuous contact between the cold external air and the compressor body 10, which causes drops in temperature of the first motor 13 and the cylinder 11 in the compressor body.

Figure 5:
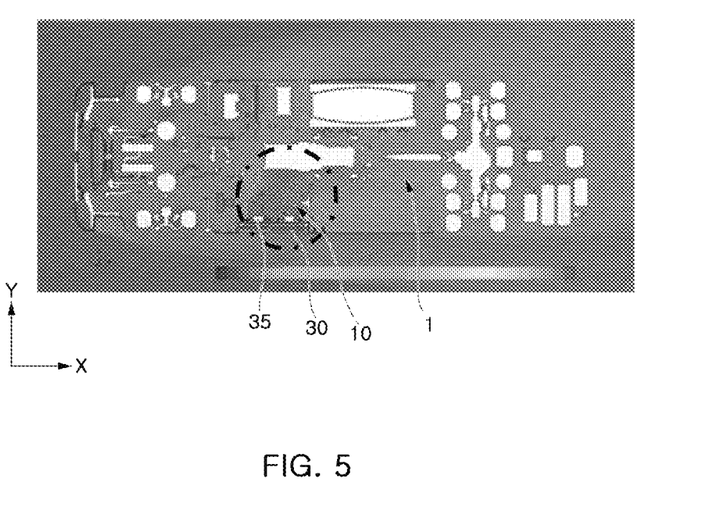
FIG. 5 illustrates a temperature field of the vehicle to which the air compressor for a vehicle according to an exemplary embodiment of the present disclosure is applied.

FIG. 5 shows a temperature field on an X-Y plane of the vehicle when the at least one blowing fan 35 of the heat exchanger 30 is driven in the air compressor for a vehicle according to an exemplary embodiment of the present disclosure.

It may be seen that hot air is supplied from the heat exchanger 30 and heat is released from the hot air toward the compressor body 10, raising a temperature of the compressor body.

When the temperature of the first motor 13 in the compressor body 10 drops to lower than the first temperature (e.g., 60° C.), the plurality of blowing fans 35 of the heat exchanger 30 may be driven to increase an amount of heat dissipation toward the compressor body inside the module, raising temperatures of the first motor and the cylinder 11 in the compressor body.

For example, when the coolant flows out of the heat exchanger 30 at a temperature of about 65° C. and at a rate of about 70 lpm (liter per minute), the amount of heat dissipation may be about 23 kW, and accordingly, an ambient temperature of the compressor body 10 may rise to temperature of external air +35° C.

Figure 6:
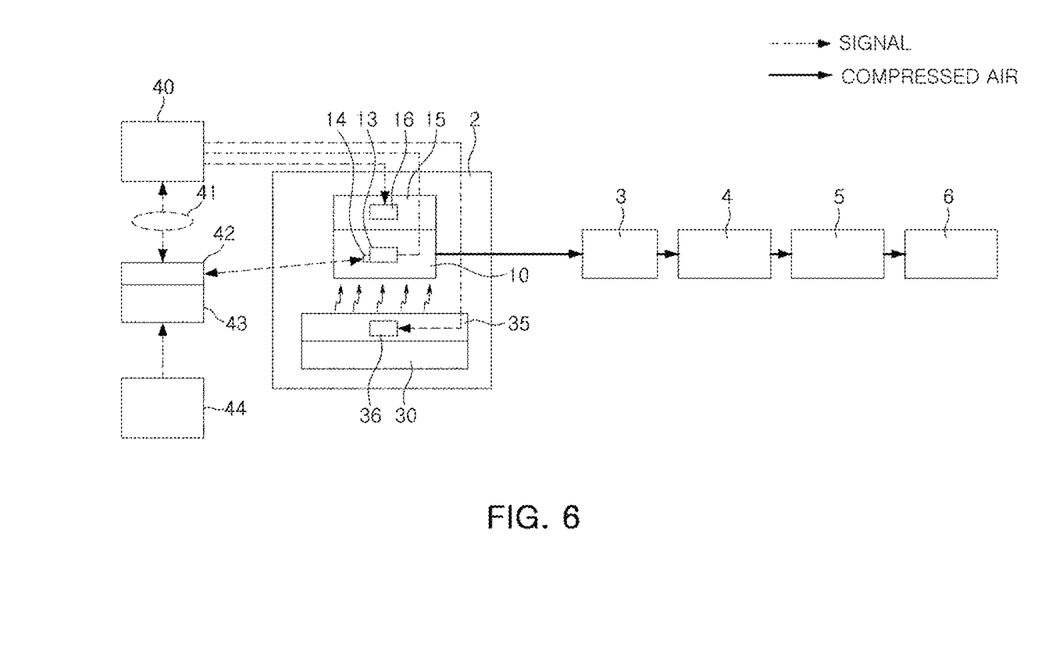
FIG. 6 is a schematic block diagram illustrating an air management system of the vehicle to which the air compressor for a vehicle according to an exemplary embodiment of the present disclosure is applied.

FIG. 6 is a schematic block diagram illustrating an air management system of the vehicle to which the air compressor for a vehicle according to an exemplary embodiment of the present disclosure is applied.

As illustrated in FIG. 6, the air management system of the vehicle may include an air compressor 2 generating compressed air of the present disclosure, a separator cooler 3 acting as an oil separator separating moisture and oil from the compressed air having a high temperature and a high humidity, an air processing unit (APU) 4 acting as a dryer dehumidifying the compressed air, an air tank 5 filled with the compressed air, and a pneumatic system 6 into which the compressed air is introduced to use pneumatic pressure thereof.

Furthermore, the air management system may include a control unit 40 and an inverter controller 42. The control unit and the inverter controller may be connected to each other by a communications link 41 using a CAN protocol.

The control unit 40 may control the air compressor 2 of the present disclosure together with the air management system. The inverter controller 42 may control the inverter 43 based on an electrical signal associated with the control unit, and may be electrically connected to the temperature detector 14 of the compressor body 10 to transmit a detection signal of the temperature sensor to the control unit.

When the vehicle is a large electric vehicle provided with a fuel cell system, such as a bus or a truck, the inverter 43 may convert DC electrical energy supplied from a fuel cell or DC electrical energy stored in the battery 44 into AC electrical energy having multiple phases, and provide the AC electrical energy to the driving motor.

Furthermore, the inverter 43 may be connected to the first motor 13 of the compressor body 10, the second motor 16 of the cooling fan 15, the third motor 36 of the at least one blowing fan 35, the motor of the pump in the coolant circuit, or the like.

Although application of power to the at least one blowing fan 35 and the cooling fan 15 is not shown in FIG. 6 for convenience of illustration, the at least one blowing fan and the cooling fan may be supplied with power, for example, from the battery 44 or from an auxiliary battery having a lower voltage than the battery.

Concerning the flow of compressed air, it is illustrated in FIG. 6 that the air compressor 2 discharges air compressed to a predetermined system pressure, and the compressed air is stored in the air tank 5 after passing through the separator cooler 3 and the APU 4. Accordingly, the compressed air is supplied to the pneumatic system 6 which requires pneumatic pressure, e.g., a braking device and a suspension device.

Conventionally, if a temperature of external air is about −10° C. in a cold environment, a discharge temperature of an air compressor becomes lower than the dew point due to the cold external air, and moisture such as condensed water is generated in a cylinder and a pipeline of the air compressor. The moisture is mixed with oil coming up from the cylinder of the air compressor, as a result generating emulsion.

If the emulsion is excessively accumulated or the emulsion is frozen because of the low temperature, the pneumatic system may not work properly, or its performance may deteriorate or get lost, leading to a vehicle safety problem.

For example, if the emulsion is excessively accumulated in the APU to such an extent that the APU is not able to discharge the emulsion, or if the emulsion is frozen in the APU, the performance of the APU may deteriorate. This may affect the braking device using pneumatic pressure downstream of the APU, leading to even a situation in which braking is impossible.

If the air compressor for a vehicle according to an exemplary embodiment of the present disclosure is applied, it is possible to prevent generation of not only moisture such as condensed water but also emulsion by operating the at least one blowing fan 35 together with the heat exchanger 30 in the above-mentioned cold environment to appropriately raise an internal temperature and a discharge temperature of the compressor body 10. As a result, it is possible to protect the pneumatic system 6 of the vehicle and keep its performance.

To appropriately maintain the internal temperature and the discharge temperature of the compressor body 10 as described above, the air compressor for a vehicle according to an exemplary embodiment of the present disclosure may use temperature information of the first motor 13 in the compressor body.

In the present disclosure, because the compressor body 10 compresses air based on the reciprocating motion of the piston in the cylinder 11 caused by the rotation motion of the first motor 13, there is a correlation between the temperature of the first motor and the internal temperature or the discharge temperature of the compressor body. Thus, by controlling the temperature of the first motor, the internal temperature and the discharge temperature of the compressor body may also be controlled simultaneously.

As illustrated in FIG. 6, the inverter controller 42 may collect the temperature information of the first motor 13 in the compressor body 10, and transmit the collected information to the control unit 40 through the communications link 41 of the vehicle. The control unit may have a sequence for controlling the operation of the at least one blowing fan 35 of the heat exchanger 30 or the cooling fan 15 of the compressor body 10 according to a preset and programmable logic.

Figure 7:
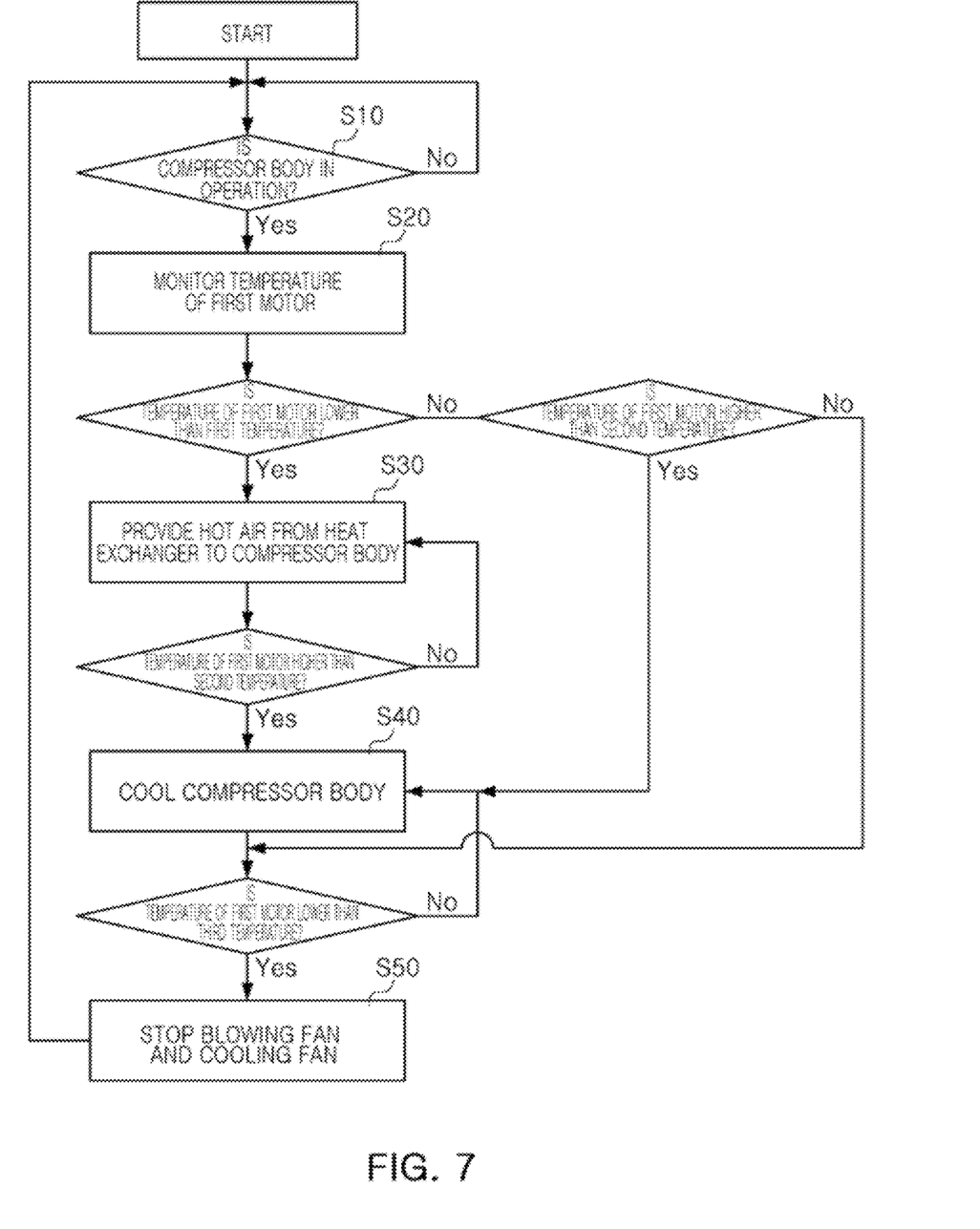
FIG. 7 is a flowchart illustrating a method for controlling a temperature of the air compressor for a vehicle according to an exemplary embodiment of the present disclosure.

FIG. 7 is a flowchart illustrating a method for controlling a temperature of the air compressor for a vehicle according to an exemplary embodiment of the present disclosure.

The method for controlling a temperature of the air compressor for a vehicle according to an exemplary embodiment of the present disclosure may include: monitoring a temperature of the first motor 13 in the compressor body, when the compressor body 10 is in operation (S20); providing hot air generated by the heat exchanger 30 to the compressor body, when the temperature of the first motor is lower than a first temperature (S30); and cooling the compressor body, when the temperature of the first motor is higher than a second temperature (S40).

First, the control unit 40 may check whether or not the compressor body is in operation (S10).

When the compressor body 10 is in operation, the control unit 40 may continuously monitor a temperature of the first motor 13 in the compressor body through the temperature detector 14 of the compressor body via the inverter controller 42 (S20). The monitoring of the temperature of the first motor may be continuously performed at least when the compressor body is in operation.

When the temperature of the first motor 13 is lower than a first temperature (e.g., 60° C.), the control unit 40 operates the at least one blowing fan 35 together with the heat exchanger 30 to generate hot air from external air, and transfers the hot air toward the compressor body 10 to raise a temperature of the compressor body (S30). The raising of the temperature of the compressor body 10 may be performed until the temperature of the first motor 13 is higher than a second temperature (e.g., 80° C.).

When the temperature of the first motor 13 becomes higher than the second temperature by raising the temperature of the compressor body 10, the control unit 40 stops the operation of at least the at least one blowing fan 35 and operates the cooling fan 15 mounted on the cylinder head 12 of the compressor body 10 to start cooling the compressor body (S40).

When the temperature of the first motor 13 becomes lower than a third temperature (e.g., 70° C.) by cooling the compressor body 10, the control unit 40 stops the operation of the cooling fan 15 together with the at least one blowing fan 35 (S50).

Meanwhile, after the monitoring of the temperature of the first motor 13, when the temperature of the first motor becomes higher than or equal to the first temperature and even higher than the second temperature, the control unit 40 may operate the cooling fan 15 to cool the compressor body 10 (S40).

Furthermore, after the monitoring of the temperature of the first motor 13, when the temperature of the first motor becomes higher than or equal to the first temperature and lower than or equal to the second temperature, the control unit 40 may compare the temperature of the first motor with the third temperature. At the instant time, when the temperature of the first motor is higher than or equal to the third temperature, the control unit 40 initiates cooling of the compressor body 10 (S40). When the temperature of the first motor is lower than the third temperature, the control unit 40 may stop the operation of the cooling fan 15 together with the at least one blowing fan 35 (S50).

When the temperature of the first motor 13 becomes lower than the first temperature back under the influence of the temperature of external air, the control unit 40 may operate the at least one blowing fan 35 to perform a control according to the same sequence as described above.

Reversely, when the temperature of the first motor 13 becomes higher than the second temperature under the influence of the temperature of external air, the control unit 40 may operate the cooling fan 15 to control a temperature of the air compressor.

As set forth above, according to an exemplary embodiment of the present disclosure, it is possible to appropriately manage an internal temperature and a discharge temperature of the air compressor in various environments by supplying hot air having a higher temperature than external air while blocking the inflow of the external air and controlling the fan of the compressor body and the fan of the heat exchanger together.

Furthermore, according to an exemplary embodiment of the present disclosure, it is possible to reduce condensed water and emulsion generated in a cold environment, preventing the condensed water and emulsion from being frozen, while a temperature is controlled by the fans in a high-temperature environment as well to prevent deteriorations of portions due to oil carbide.

Furthermore, according to an exemplary embodiment of the present disclosure, by modularizing the compressor body and the heat exchanger, one support bracket may be shared for structures for fixing two large-volume components. Thus, it is possible to efficiently lay out the components of the vehicle, and accordingly, costs may be reduced.

Furthermore, according to an exemplary embodiment of the present disclosure, because the air cooler is employed, the configuration of the device may be simplified as compared with that when a water cooler, which requires a coolant and a coolant circuit, is employed, and accordingly, the costs may be additionally reduced.

Last, according to an exemplary embodiment of the present disclosure, it is possible to prevent failures of several parts in various environments and increase their life span, resulting in an increase in reliability of the air management system of the vehicle, improving the commerciality of the vehicle.

Although the technical idea of the present disclosure has been described above with reference to exemplary embodiments of the present disclosure, various changes and modifications may include those skilled in the art without departing from the essential features of the present disclosure.

Furthermore, the term related to a control device such as "controller", "control apparatus", "control unit". "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside". "outside", "inwardly", "outwardly", "interior", "exterior", "internal". "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An air compressor apparatus for a vehicle, the air compressor apparatus comprising:
   a compressor body driven by a first motor;
   a support bracket supporting the compressor body and configured to be coupled to the vehicle; and
   a heat exchanger provided on one side of the support bracket, and configured for raising a temperature of external air to generate heated air and provide the heated air to the compressor body,
   wherein the heat exchanger includes at least one blowing fan supplied with power to rotate, and
   wherein the heated air from the heat exchanger is supplied onto an external surface of the compressor body by the at least one blowing fan.

2. The air compressor apparatus of claim 1,
   wherein the compressor body includes a cylinder and a cooling fan provided on the cylinder to cool the cylinder, and
   wherein the cooling fan includes a second motor.

3. The air compressor apparatus of claim 2, wherein cooled air from the cooling fan is transferred to an external peripheral surface of the cylinder and the external surface of the compressor body.

4. The air compressor apparatus of claim 2,
   wherein the heat exchanger has a flow path formed for a coolant to flow therethrough, and
   wherein the at least one blowing fan includes a third motor.

5. The air compressor apparatus of claim 4, wherein the heat exchanger is further configured as an electric radiator cooling a power electric module of the vehicle.

6. The air compressor apparatus of claim 4, wherein the compressor body further includes a temperature detector measuring a temperature of the first motor.

7. The air compressor apparatus of claim 6, further including:
   a control unit controlling the at least one blowing fan of the heat exchanger and the cooling fan of the compressor body to be selectively operated according to a detection signal received from the temperature detector.

8. The air compressor apparatus of claim 7, wherein the control unit is configured for:
   monitoring the temperature of the first motor in the compressor body, when the compressor body is in operation;
   providing the heated air generated by the heat exchanger to the compressor body by operating the third motor to drive the at least one blowing fan, when the temperature of the first motor is lower than a first temperature; and
   cooling the compressor body, by operating the second motor to drive the cooling fan, when the temperature of the first motor is higher than a second temperature,
   wherein the second temperature is higher than the first temperature.

9. The air compressor apparatus of claim 8, further including:
   after the cooling of the compressor body, stopping operation of the at least one blowing fan and the cooling fan when the temperature of the first motor becomes higher than or equal to the first temperature and lower than a third temperature,
   wherein the third temperature is higher than the first temperature and lower than the second temperature.

10. The air compressor apparatus of claim 8, further including:
    after the monitoring of the temperature of the first motor:
    comparing the temperature of the first motor with a third temperature when the temperature of the first motor is higher than or equal to the first temperature and lower than or equal to the second temperature;
    cooling the compressor body when the temperature of the first motor is higher than or equal to the third temperature; and
    stopping operation of the at least one blowing fan and the cooling fan when the temperature of the first motor is lower than the third temperature,
    wherein the third temperature is higher than the first temperature and lower than the second temperature.

11. The air compressor apparatus of claim 7,
    wherein the control unit is electrically connected to the temperature detector via an inverter controller, and
    wherein the control unit and the inverter controller are connected to each other through a communications link.

12. The air compressor apparatus of claim 1, wherein the heat exchanger is provided to face an outside of the vehicle on the support bracket.

13. A method for controlling a temperature of the air compressor apparatus for the vehicle of claim 1, the method including:
    monitoring, by a control unit, a temperature of the first motor driving the compressor body, when the compressor body is in operation;
    providing, by the control unit, the heated air generated by the heat exchanger to the compressor body, when the temperature of the first motor is lower than a first temperature; and
    cooling, by the control unit, the compressor body, when the temperature of the first motor is higher than a second temperature,
    wherein the second temperature is higher than the first temperature.

14. The method of claim 13, further including determining whether or not the compressor body is in operation.

15. The method of claim 13, wherein the providing of the heated air to the compressor body is performed by the control unit operating a third motor to drive the at least one blowing fan.

16. The method of claim 13, wherein the cooling of the compressor body is performed by the control unit operating a second motor to drive the cooling fan.

17. The method of claim 13, further including:
   after the cooling of the compressor body, stopping operation of the at least one blowing fan and a cooling fan when the temperature of the first motor becomes higher than or equal to the first temperature and lower than a third temperature,
   wherein the third temperature is higher than the first temperature and lower than the second temperature.

18. The method of claim 13, further including:
   after the monitoring of the temperature of the first motor:
   comparing, by the control unit, the temperature of the first motor with a third temperature when the temperature of the first motor is higher than or equal to the first temperature and lower than or equal to the second temperature;
   cooling, by the control unit, the compressor body when the temperature of the first motor is higher than or equal to the third temperature; and
   stopping, by the control unit, operation of the at least one blowing fan and a cooling fan when the temperature of the first motor is lower than the third temperature,
   wherein the third temperature is higher than the first temperature and lower than the second temperature.

\* \* \* \* \*